C. E. RYMES.
HYDRAULIC PRESS.
No. 38,606. Patented May 19, 1863.
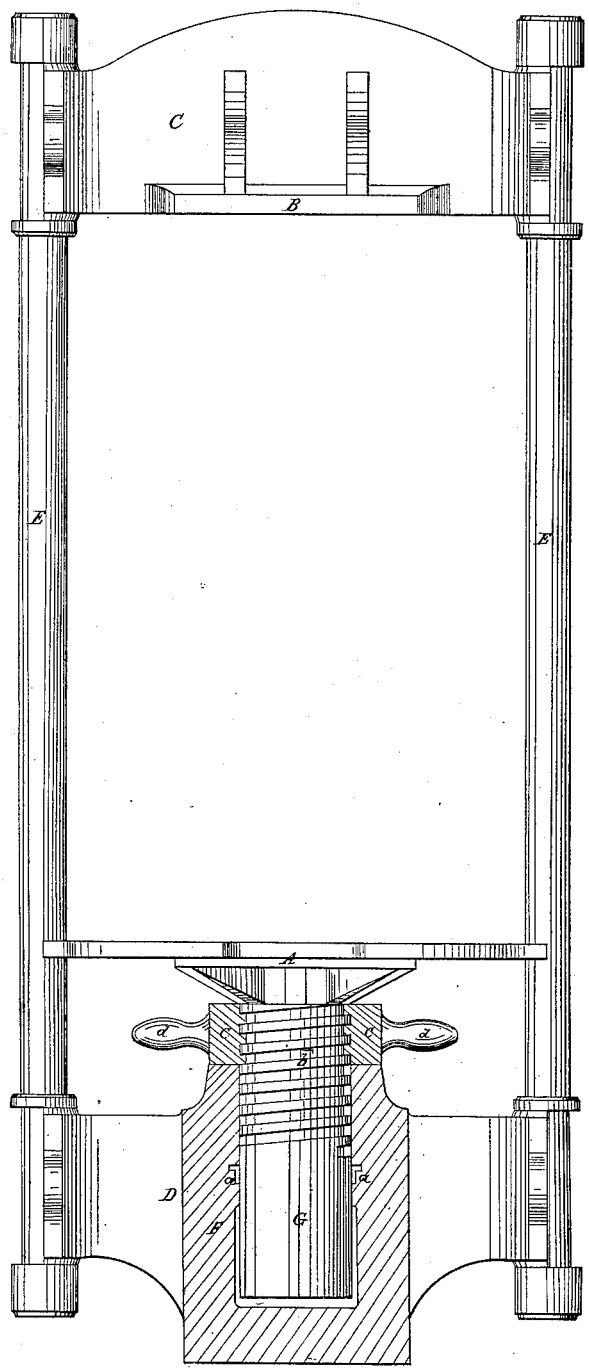
Witnesses
Inventor

UNITED STATES PATENT OFFICE.

CHRISTOPHER E. RYMES, OF CHARLESTOWN, MASSACHUSETTS.

IMPROVEMENT IN HYDRAULIC PRESSES.

Specification forming part of Letters Patent No. 38,606, dated May 19, 1863.

*To all whom it may concern:*

Be it known that I, CHRISTOPHER E. RYMES, a resident of Charlestown, in the county of Middlesex and State of Massachusetts, have invented a new and useful Improvement in the Hydraulic Press, and I do hereby declare the same to be fully described in the following specification, and represented in the accompanying drawing, which is a sectional elevation of a press provided with my invention or improvement.

The nature of the said invention consists in the arrangement or combination of a screw and nut with the press-cylinder, piston, and platen, substantially in the manner and so as to operate therewith, as hereinafter specified.

In the said drawings, A denotes the platen, B the bed-plate, C and D the cross bars, and E E the upright posts or connection-bars of the press.

Cast or founded in one piece with the lower cross-bar, D, is the hydraulic cylinder F, within which the piston G, extended downward from the platen A, is inserted, and, when in use, slides in a stuffing inserted within a groove, *a a*, formed in the cylinder. On that part of the piston which is between the stuffing and the upper end of the piston when the said piston is at its lowest position in the cylinder, a male screw, *b*, is formed or made. On this screw a nut, *c*, provided with one or more handles, *d d*, is screwed, the whole being as shown in the drawing. The object of such screw and nut is to retain the piston at any desirable position to which it may be elevated by the pressure of water that may be pumped or forced into the cylinder. With powerful hydraulic pressure it is difficult to prevent more or less leakage of the water from the cylinder, which, whenever it may occur, will diminish the amount of upward pressure of the piston. By the application of the screw and nut directly to the piston and cylinder, and the arrangement of the said screw and nut between the cylinder and the platen in manner as above mentioned and as represented in the accompanying drawing, we have the means of maintaining the pressure, irrespective of leakage, as described, as after the elevation of the piston we have only to so turn the nut on the screw as to cause the nut to descend closely upon the head or upper end of the cylinder, in which case the nut will support the screw at its attained elevation, and will maintain it there, whatever may be the extent of leakage from the cylinder. By having the screw and nut applied directly to the cylinder and piston we avoid the necessity of employing any retaining appliances in direct connection with either the upright rods or the cross-bars of the press; and, furthermore, we have the power-retaining mechanism so situated that it will always operate centrally underneath and with respect to the platen, and with a single rotary motion.

I claim—

The arrangement or combination of the screw *b* and nut *c* with the hydraulic-press cylinder F, piston G, and platen A, substantially in the manner and so as to operate therewith, as hereinbefore specified.

CHRISTOPHER E. RYMES.

Witnesses:
R. H. EDDY,
F. P. HALE, Jr.